United States Patent Office 3,300,510
Patented Jan. 24, 1967

---

3,300,510
HYDANTOINS
Harvey E. Alburn, West Chester, Donald E. Clark, Norristown, and Norman H. Grant, Wynnewood, Pa., assignors to American Home Products Corporation, New York, N.Y., a corporation of Delaware
No Drawing. Filed Mar. 6, 1964, Ser. No. 350,118
5 Claims. (Cl. 260—309.5)

This invention relates to novel hydantoin compounds which exhibit mydriatic stimulant, analgesic and antidepressant activity in mammals.

The claimed compounds have the following general formula:

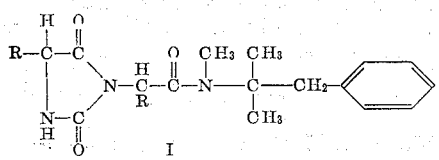

where R is hydrogen, alkyl having up to 6 carbons, phenyl optionally substituted in either the o, m, or p positions by halogen, nitro(lower)alkyl, halo(lower)alkyl; or indolealkyl, where the alkyl moiety has up to 3 carbon atoms.

The compounds of this invention are produced advantageously as indicated hereinbelow by reacting two equivalents of an N-carboxyamino acid anhydride (II) with one equivalent of N,α,α-trimethylphenethylamine (III). This reaction readily takes place at room temperature and is preferably carried out in an inert solvent such as dioxane or ethyl acetate or a mixture of such solvents. The hydantoin product is usually recovered in its hydrated form.

The reaction whereby the claimed compounds are produced is shown below:

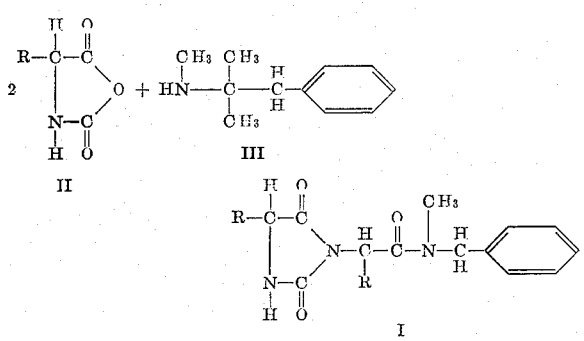

The starting N-carboxy amino acid anhydrides (II) are well known in the art. The other starting material N,α,α-trimethylphenethylamine, which is more commonly known as mephentermine, can be prepared by hydrogenating 1-chloro-2-methylamino-2-methyl-1-phenylpropane in the presence of palladium barium carbonate as described in U.S. Patent 2,597,445 to Bruce et al.; or by the process described in U.S. Patent 2,590,079 to Abel et al.

The following examples are intended to illustrate but not to limit the invention.

EXAMPLE 1

N-(α,α-dimethylphenethyl)-N-methyl-α-5-diphenyl-3-hydantoinacetamide

Four grams of mephentermine sulfate was treated with barium hydroxide in water, and the resulting mixture was extracted with ether. The ether extract was concentrated to 2 ml. and was then stirred at room temperature for 2 hours with 2.2 grams of N-carboxy-2-phenylglycine anhydride in 75 ml. of ethyl acetate-dioxane (1:2). The reaction mixture was filtered, the filtrate was evaporated to dryness, and the residue was washed twice with ethyl ether. It was then extracted by 20 ml. of ethyl acetate. The product was crystallized by the careful addition of ether.

Analysis.—Calcd. for $C_{28}H_{29}O_3N_3 \cdot H_2O$: C, 71.0; H, 6.6; N, 8.9. Found: C, 70.3; H, 6.5; N, 8.8.

This product is active as a mydriatic stimulant.

EXAMPLE 2

N-(α,α-dimethylphenethyl)-N,α,5-trimethyl-3-hydantoinacetamide

A mixture consisting of 4.28 ml. of mephentermine base in 110 ml. of dioxane plus 3.0 grams of N-carboxyalanine anhydride in 55 ml. of ethyl acetate was allowed to stand for 2 hours at room temperature. A precipitate, which began to form after 15 minutes, was removed, and the filtrate was concentrated. Ethyl ether was added, and a precipitate, weighing 2 grams after drying, was collected. This product was recrystallized from ethyl acetate, giving 1.4 grams.

Analysis.—Calcd. for $C_{18}H_{25}O_3N_3 \cdot H_2O$: C, 61.9; H, 7.7; N, 12.0. Found: C, 61.6; H, 7.8; N, 12.0.

The product is active as a mydriatic stimulant and possesses marked antireserpine activity.

EXAMPLE 3

α,5-bis(3-indolylmethyl)-N-(α,α-dimethylphenethyl)-N-methyl-3-hydantoinacetamide A mixture consisting of 5.2 grams of N-carboxytryptophan anhydride in 100 ml. of ethyl acetate plus 3.7 grams of mephentermine base in 100 ml. of dioxane was stirred at room temperature for 1.5 hours and then filtered. The filtrate was evaporated to an oil, which was stirred with ether and filtered. The ether-insoluble product, upon drying, weighed 4.8 grams. The product had antireserpine and mydriatic stimulant activity.

EXAMPLE 4

N-(α,α-dimethylphenethyl)-N-methyl-3-hydantoinacetamide

Five grams of N-carboxyglycine anhydride was stirred at room temperature with 4.5 ml. of mephentermine base in a mixture of 100 ml. of dioxane and 25 ml. of ethyl acetate. The system was filtered, concentrated, and mixed with ethyl ether to the first signs of cloudiness. After chilling, the crystalline product was collected.

When applying the procedure of the above examples to the starting compounds listed below, the products hereinafter listed are obtained:

| Starting Compounds | Products |
| --- | --- |
| Mephentermine and N-carboxy-2-(p-ethylphenyl)glycine anhydride. | α,5-bis(p-ethylphenyl)-N-(α,α-dimethylphenethyl)-N-methyl-3-hydantoinacetamide. |
| Mephentermine and N-carboxy-2-(o-nitrophenyl)glycine anhydride. | α,5-bis(o-nitrophenyl)-N-(α,α-dimethylphenethyl)-N-methyl-3-hydantoinacetamide. |
| Mephentermine and N-carboxy-2-(m-chlorophenyl)glycine anhydride. | N-(α,α-dimethylphenethyl)-N-methyl-α,5-bis(m-chlorophenyl)-3-hydantoinacetamide. |
| Mephentermine and N-carboxy-2-(p-dichloromethylphenyl)glycine anhydride. | N-(α,α-dimethylphenethyl)-N-methyl-α,5-bis(p-dichloromethylphenyl)-3-hydantoinacetamide. |
| Mephentermine and 2-(propyl)glycine anhydride. | N-(α,α-dimethylphenethyl)-N-methyl-α,5-dipropyl-3-hydantoinacetamide. |
| Mephentermine and 2-(hexyl)glycine anhydride. | N-(α,α-dimethylphenethyl)-N-methyl-α,5-(dihexyl)-3-hydantoinacetamide. |
| Mephentermine and N-carboxy-2-(p-tolyl)glycine anhydride. | α,5-bis(p-tolyl)-N-(α,α-dimethylphenethyl)-N-methyl-3-hydantoinacetamide. |
| Mephentermine and 2-amino-4-indolylbutyric anhydride. | α,5-bis(3-indolylethyl)-N-(α,α-dimethylphenethyl)-N-methyl-3-hydantoinacetamide. |
| Mephentermine and 2-amino-5-indolylpentanoic anhydride. | α,5-bis(3-indolylpropyl)-N-(α,α-dimethylphenethyl)-N-methyl-3-hydantoinacetamide. |

The compounds of this invention can be administered with pharmaceutically inert carriers in a wide variety of oral or parenteral unit dosage forms containing 25, 100, 250 or 500 mg. of active ingredients for the symptomatic adjustment of the dosage, or in admixture with other active compounds.

The present invention also includes the process of bringing the compounds thereof into a form suitable for therapeutic administration by associating them with liquid or solid, pharmaceutically acceptable carriers.

What is claimed is:

1. A compound of the formula:

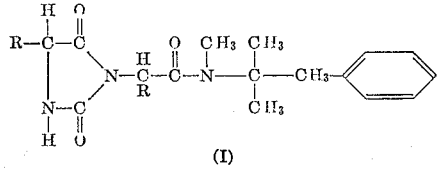

(I)

wherein R is selected from the group consisting of hydrogen, alkyl having up to 6 carbon atoms in the chain, phenyl, halophenyl, (lower)alkylphenyl, nitrophenyl, halo(lower)alkylphenyl and indolealkyl in which the alkyl moiety has from one to three carbon atoms in the chain.

2. N - (α,α - dimethylphenethyl) - N - methyl - α,5-diphenyl-3-hydantoinacetamide.

3. N - (α,α - dimethylphenethyl) - N,α,5 - trimethyl-3-hydantoinacetamide.

4. α,5 - bis(3 - indolylmethyl) - N - (α,α - dimethylphenethyl)-N-methyl-3-hydantoinacetamide.

5. N - (α,α - dimethylphenethyl) - N - methyl - 3-hydantoinacetamide.

No references cited.

WALTER A. MODANCE, *Primary Examiner.*

N. TROUSOF, *Assistant Examiner.*

UNITED STATES PATENT OFFICE
CERTIFICATE OF CORRECTION

Patent No. 3,300,510                  January 24, 1967

Harvey E. Alburn et al.

It is hereby certified that error appears in the above numbered patent requiring correction and that the said Letters Patent should read as corrected below.

Column 1, lines 40 to 45, for the right-hand portion of the formula reading

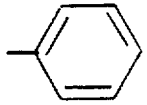      read      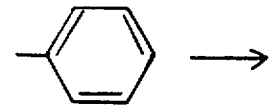

same column 1, lines 47 to 55, formula I should appear as shown below instead of as in the patent:

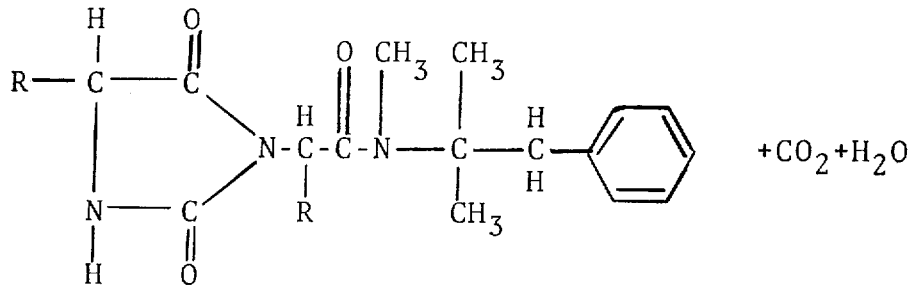

column 4, lines 7 to 14, the formula should appear as shown below instead of as in the patent:

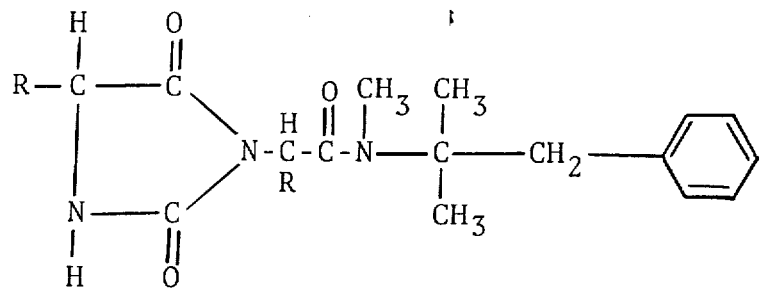

Signed and sealed this 18th day of June 1968.

(SEAL)
Attest:

EDWARD M. FLETCHER, JR.
Attesting Officer

EDWARD J. BRENNER
                                             Commissioner of Patents